US 8,456,143 B2

(12) United States Patent
Nakashima

(10) Patent No.: US 8,456,143 B2
(45) Date of Patent: Jun. 4, 2013

(54) DC-DC CONVERTER AND SEMICONDUCTOR INTEGRATED CIRCUIT FOR CONTROLLING POWER SOURCE

(75) Inventor: Heisuke Nakashima, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 354 days.

(21) Appl. No.: 12/808,048

(22) PCT Filed: Dec. 2, 2008

(86) PCT No.: PCT/JP2008/071846
§ 371 (c)(1),
(2), (4) Date: Jun. 14, 2010

(87) PCT Pub. No.: WO2009/078271
PCT Pub. Date: Jun. 25, 2009

(65) Prior Publication Data
US 2010/0283442 A1    Nov. 11, 2010

(30) Foreign Application Priority Data
Dec. 14, 2007 (JP) .................................. 2007-323761

(51) Int. Cl.
*G05F 1/613* (2006.01)
(52) U.S. Cl.
USPC ......................................... 323/224; 323/284
(58) Field of Classification Search
USPC .......................................... 323/224, 283, 284
See application file for complete search history.

(56) References Cited

U.S. PATENT DOCUMENTS

| | | | | |
|---|---|---|---|---|
| 6,215,288 | B1 * | 4/2001 | Ramsey et al. | 323/224 |
| 7,170,272 | B2 * | 1/2007 | Yoshida | 323/284 |
| 7,482,788 | B2 * | 1/2009 | Yang | 323/224 |
| 8,111,051 | B2 * | 2/2012 | Sakai et al. | 323/224 |
| 2005/0285579 | A1 | 12/2005 | Yasukouchi et al. | |
| 2007/0063285 | A1 | 3/2007 | Fujino et al. | |

FOREIGN PATENT DOCUMENTS

| | | |
|---|---|---|
| JP | 05-022936 A | 1/1993 |
| JP | 2000-092824 A | 3/2000 |
| JP | 2006-14482 A | 1/2006 |
| JP | 2006-060977 | 3/2006 |
| JP | 2006-333636 A | 12/2006 |
| WO | WO 2006/087850 A1 | 8/2006 |

OTHER PUBLICATIONS

Japanese Office Action dated Oct. 26, 2010 (and English translation thereof) in counterpart Japanese Application No. 2007-323761.
International Search Report dated Feb. 17, 2009 issued in International Appln. No. PCT/JP2008/071846.

* cited by examiner

*Primary Examiner* — Shawn Riley
(74) *Attorney, Agent, or Firm* — Holtz, Holtz, Goodman & Chick, P.C.

(57) ABSTRACT

A control technology which eliminates the need for changing the switching frequency even under light load where the on-time of a drive switching element becomes shorter than a minimum on-time dependent on the characteristics of the circuit in a synchronous rectification switching regulator. The synchronous rectification switching regulator includes a drive switching element for storing energy in a coil by applying a DC input voltage from a DC power supply to an inductor and permitting a current to flow, and a rectification switching element for rectifying the current of the inductor during an energy discharge period where the drive switching element is turned off. The timing for turning off the rectification switching element under light load is delayed so as to store energy in the inductor from the output, and the on-time is controlled to become longer as the load becomes lighter by the output from an error amplifier.

5 Claims, 12 Drawing Sheets

(a) TW1

(b) TW2

(c) Ppwm (d) MINIMUM ON-TIME PULSE Pmin (e) OUTPUT OF COMPARATOR 25

(f) OUTPUT OF REVERSE CURRENT DETECTING COMPARATOR 24

(g) S1

(h) S2

(i) INDUCTOR CURRENT

DC-DC CONVERTER AND SEMICONDUCTOR INTEGRATED CIRCUIT FOR CONTROLLING POWER SOURCE

This application is a U.S. National Phase Application under 35 USC 371 of International Application PCT/JP2008/071846 filed Dec. 2, 2008.

TECHNICAL FIELD

The present invention relates to a DC-DC converter converting a direct-current voltage and a semiconductor integrated circuit for controlling power source of the DC-DC converter. The present invention more particularly relates to a technique effective at the time of being applied to a synchronously rectifying switching regulator capable of being improved in the power efficiency thereof without any changes of the switching frequency thereof at the time of a light load.

BACKGROUND ART

There is a switching regulator as a circuit converting an input direct-current voltage to output a direct-current voltage having different electric potential. The switching regulator includes a synchronously rectifying switching regulator, which is provided with a driving switching element and a rectifying switching element. The driving switching element applies a direct-current power source voltage supplied from a direct-current power source, such as a battery, to an inductor (coil) to flow an electric current and accumulate energy in the coil. The rectifying switching element rectifies a coil current in an energy discharging period, in which the driving switching element is off. The synchronously rectifying switching regulator turning on and off the driving switching element and the rectifying switching element complementarily to enhance the power efficiency thereof in comparison with a diode rectifying switching regulator.

The synchronously rectifying switching regulator has the problem of the lowering of the power efficiency at the time of a light load, and accordingly various inventions have hitherto been proposed in order to settle this problem (see, for example, Japanese Patent Application Laid-Open Publication No. 2000-092824). Furthermore, a similar problem exists in an insulated switching regulator, using a transformer, and accordingly various inventions for settling this problem have also proposed (see, for example, Japanese Patent Application Laid-Open Publication No. Hei 05-022936).

DISCLOSURE OF THE INVENTION

Problem to be Solved by the Invention

Concerning a synchronously rectifying switching regulator, there is a technique of performing PWM (pulse-width modulation) control in a current continuity mode when a load is heavy, and performing the PWM control in a current discontinuity mode of turning off the rectifying switching element while a reverse direction current tends to flow in order to prevent the lowing of the power efficiency thereof by the flow of the reverse direction current through the rectifying switching element when the load becomes light. FIGS. 11A, 11B and 11C show on-off timings of several switching elements and changes of the current of the inductor in the case of applying the above control. FIG. 11A shows a case of a heavy load; FIG. 11B shows a case of a light load; FIG. 11C shows a case of more lighter load.

It PWM control is performed in the current discontinuity mode, then the on-time of the driving switching element becomes shorter and the current of the inductor decreases as the load becomes lighter. Consequently, the loss owing to an on-resistance of a switch and the loss in the inductor decrease, and the power efficiency becomes higher. When the load becomes further lighter and the on-time of the driving switching element becomes shorter than the minimum on-time, determined by the characteristics of the circuit, then the inductor current cannot be decreased, and accordingly the PFM (pulse-frequency modulation) control, lowering a clock frequency as shown in FIG. 10A, the PDM (pulse-duration modulation) control, skipping clocks as shown in FIG. 10B, or the like is performed.

In the case of performing this sort of control, the on-times of the switching elements at the time of the light load, when the PFM control or the PDM control is performed, are left to be constant as shown in FIG. 9A. As a result, as shown in FIG. 9B, the average switching frequency in the period of the PFM control or the PDM control changes (lowers), and consequently the synchronously rectifying switching regulator has problems such as, the design of an EMI filter becomes complicated; the noise measure thereof becomes difficult; ripples become larger; abnormal noise is output when the average switching frequency lowers to the audible area; and the like.

The present invention was made by having an eye to the problems mentioned above, and aims to provide a control technique capable of improving the power efficiency of a synchronously rectifying DC-DC converter without changing the switching frequency thereof even at the time of a light load when the on-time of the driving switching element may be shorter than the minimum on-time, determined by the characteristics of the circuit or the control system.

Means for Solving the Problems

To achieve the above mentioned object, the present invention provides a synchronously rectifying DC-DC converter including a driving switching element to apply a direct-current input voltage supplied from a direct-current power source to an inductor (a coil) to make an electric current flow to accumulate energy in the inductor, and a rectifying switching element to rectify the electric current of the inductor in an energy discharging period, in which the driving switching element is off, characterized in that an on-time of the rectifying switching element is controlled to become longer as a load becomes lighter by delaying a timing of turning off a rectifying switching element in order to accumulate the energy in the inductor from an output of the DC-DC converter at a time of a light load, at which an on-time of the driving switching element may be shorter than a predetermined minimum on-time.

Here, the minimum on-time of the driving switching element means a broad minimum on-time including the minimum on-time determined by the limitations of an applied control system besides a narrowly defined minimum on-time determined by the characteristics of the switching element and the driving force of the circuit performing the on-off drive of the switching element.

Effect of the Invention

According to the present invention, it is possible to improve the power efficiency of a synchronously rectifying DC-DC converter without changing the switching frequency thereof even in the case of a light load for which the on-time of the driving switching element of the converter may be shorter than the minimum on-time determined by the characteristics of the circuit and the control system of the switching element, and thereby to obtain the effect of being capable of settling the problems such as, the complication of the design of an EMI filter owing to the changes of the switching frequency, the enlargement of ripples, the generation of abnormal noise when the switching frequency lowers to the audible area, and the like.

BRIEF DESCRIPTION OF DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

BEST MODE FOR CARRYING OUT THE INVENTION

In the following, the preferred embodiments of the present invention will be described with reference to the accompanying drawings.

Figure 1:
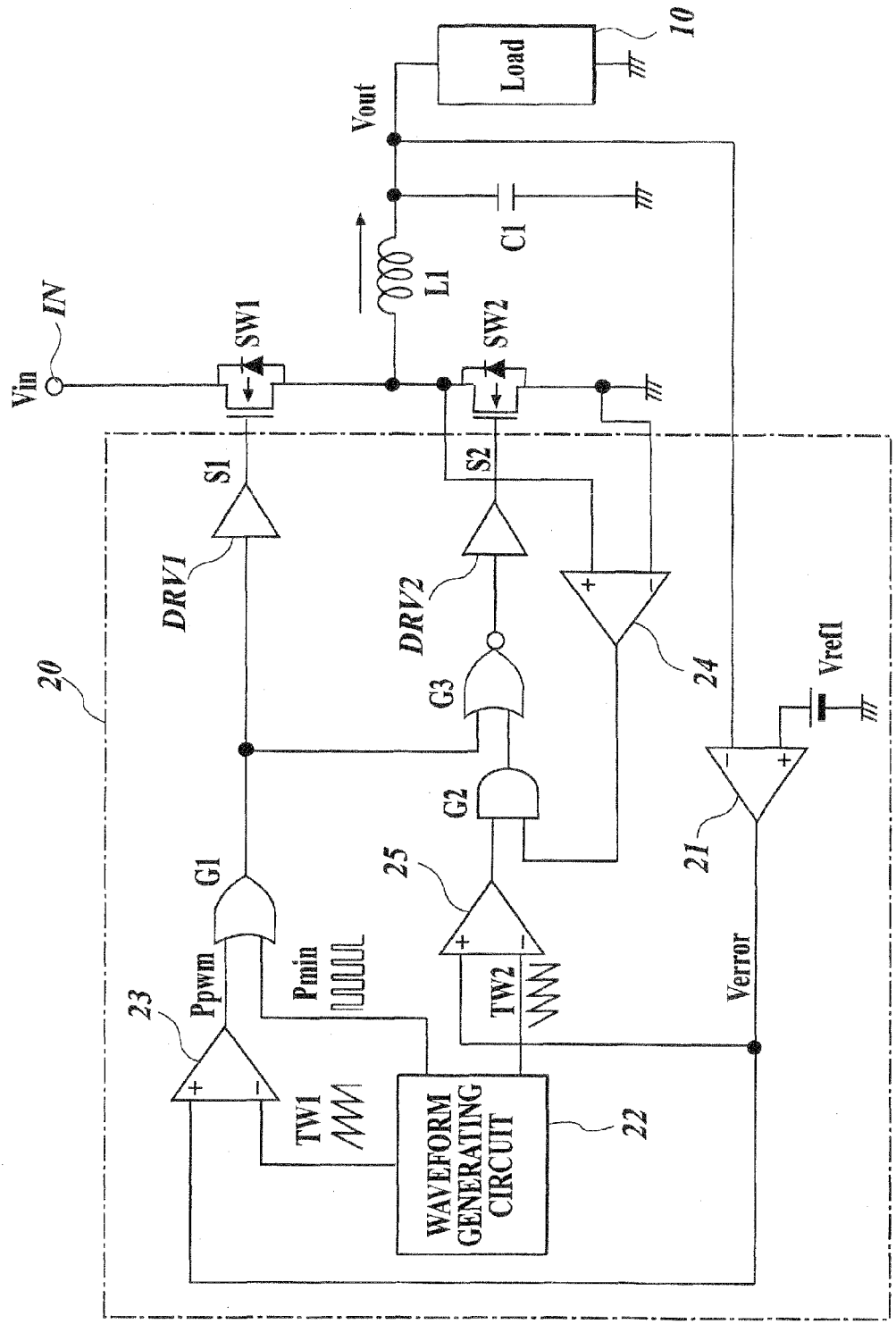
FIG. 1 is a circuit configuration diagram showing a first embodiment of a switching regulator to which the present invention is applied.

FIG. 1 shows a first embodiment of a step-down switching regulator to which the present invention is applied.

The switching regulator of this embodiment is provided with a coil L1 as an inductor, a driving switch transistor SW1, a rectifying switch transistor SW2, a switching control circuit 20, and a smoothing capacitor C1. The driving switch transistor SW1 is composed of an N channel MOS FET (insulated-gate field-effect transistor). The N channel MOS FET is connected between a voltage input terminal IN and one terminal of the coil L1 to make a drive current flow into the coil L1. A direct-current input voltage Vin is applied to the voltage input terminal IN. The rectifying switch transistor SW2 is made of an N channel MOS FET. The switching control circuit 20 performs the on-off control of these switch transistors SW1 and SW2. The smoothing capacitor C1 is connected between the other terminal of the coil L1 and a ground point. A mark 10 denotes a circuit or an apparatus, which is a load.

The switching regulator of this embodiment is configured to generate PWM (pulse-width modulation) drive pulses to turn on and off the transistors SW1 and SW2 complementarily by the switching control circuit 20. In a steady state, when the driving transistor SW1 is turned on, the direct-current input voltage Vin is applied to the coil L1, and a current toward the output terminal flows to charge the smoothing capacitor C1. When the driving transistor SW1 is turned off, the rectifying transistor SW2 is turned on in turn, and a current flows through the coil L1 through the turned-on transistor SW2. Then, the pulse widths of the drive pulses input into the control terminal (gate terminal) of the SW1 are controlled according to output voltages, and thereby a direct-current output voltage Vout lower than the direct-current input voltage Vin is generated.

The switching control circuit 20 is provided with an error amplifier 21, a waveform generating circuit 22, and a PWM comparator 23. The output voltage Vout is input into the inverting input terminal of the error amplifier 21, and a reference voltage Vref1 is applied to the non-inverting input terminal of the error amplifier 21. The waveform generating circuit 22 is made of an oscillating circuit and the like, and generates sawtooth waves (triangular waves) having predetermined frequencies and a pulse signal Pmin having a pulse width corresponding to the minimum on-time of the driving transistor SW1. The PWM comparator 23 receives the inputs of an output Verror of the error amplifier 21 and a sawtooth wave TW1, supplied from the waveform generating circuit 22. The PWM comparator 23 generates a PWM drive pulse Ppwm, which has a pulse width according to the potential difference between the output Verror and the sawtooth wave TW1 and is applied to the gate terminals of the transistors SW1 and SW2.

The PWM comparator 23 operates to widen the pulse width of the PWM drive pulse Ppwm, turning on and off the transistor SW1, when the output voltage Vout lowers. The PWM comparator 23 operates to narrow the pulse width of the PWM drive pulse Ppwm when the output voltage Vout adversely heightens. That is, the duty ratio of the PWM drive pulse Ppwm changes according to the level of the output voltage Vout to lengthen the on-time of the transistor SW1 when the output voltage Vout lowers and shorten the on-time of the transistor SW1 when the output voltage Vout heightens. In this way, the switching control circuit 20 of FIG. 1 performs the feedback control of keeping the output voltage Vout constant by the PWM system.

Figure 3A:
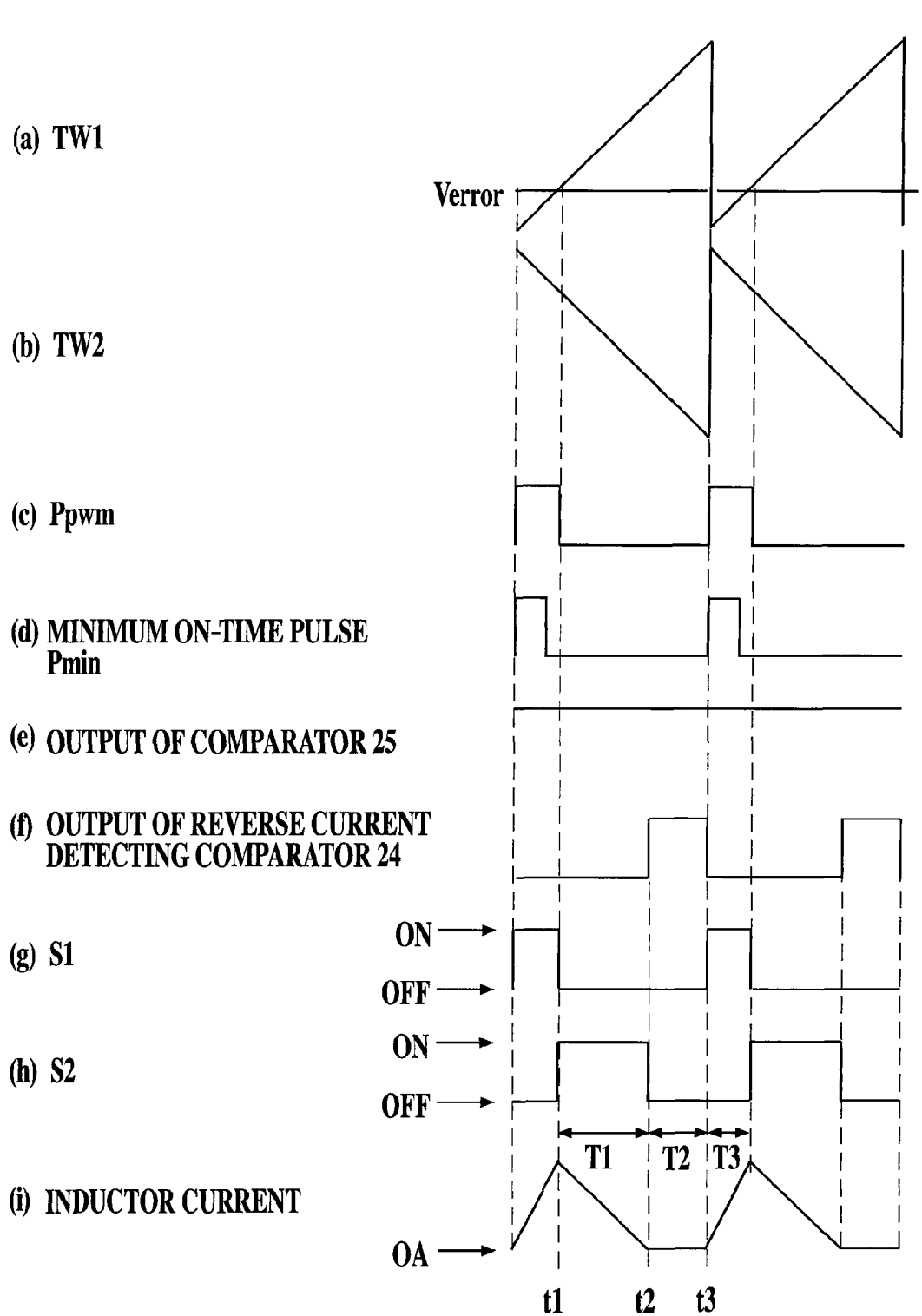
FIG. 3A is a timing chart showing the states of the changes of the signals and electric potential of the several sections when the load of the switching regulator of the first embodiment is rather small.

The control circuit 20 is furthermore provided with a reverse current detecting comparator 24 and a comparator 25. The reverse current detecting comparator 24 receives the inputs of the drain voltage and the source voltage of the rectifying transistor SW2, and the reverse current detecting comparator 24 judges whether some reverse direction current flows on the basis of the potential difference between the drain voltage and the source voltage or not. The comparator 25 receives the inputs of the output Verror of the error amplifier 21 and a sawtooth wave TW2, supplied from the waveform generating circuit 22. As shown in FIGS. 3A and 3S, the sawtooth wave TW2, input into the comparator 25, and the sawtooth wave TW1, input into the PWM comparator 23, are made to be vertically symmetrical waveforms.

The control circuit 20 is furthermore provided with an OR gate circuit G1, a driver circuit DRV1, an AND gate circuit G2, a NOR gate circuit G3, and a driver circuit DRV2. The OR gate circuit G1 receives the inputs of the PWM drive pulse Ppwm, output from the PWM comparator 23, and the pulse signal Pmin, output from the waveform generating circuit 22. The driver circuit DRV1 receives the output of the OR gate circuit G1 to generate a gate drive signal (switch control signal S1) of the driving transistor SW1. The AND gate circuit G2 receives the inputs of the output of the comparator 25 and the output of the reverse current detecting comparator 24. The NOR gate circuit G3 receives the inputs of the output of the AND gate circuit G2 and the output of the OR gate circuit G1. The driver circuit DRV2 receives the output of the NOR gate circuit G3 to generate a gate drive signal (switch control signal S2) of the rectifying transistor SW2.

The elements constituting the switching regulator other than the coil L1 and the smoothing capacitor C1 are formed on a semiconductor chip. The control circuit 20 is made as a semiconductor integrated circuit (IC), and the coil L1 is configured as an external element to be connected to an external terminal provided in this IC.

Next, the operation of the switching regulator, having configuration described above, will be described with reference to the waveform diagram of FIG. 3.

Figure 11A:
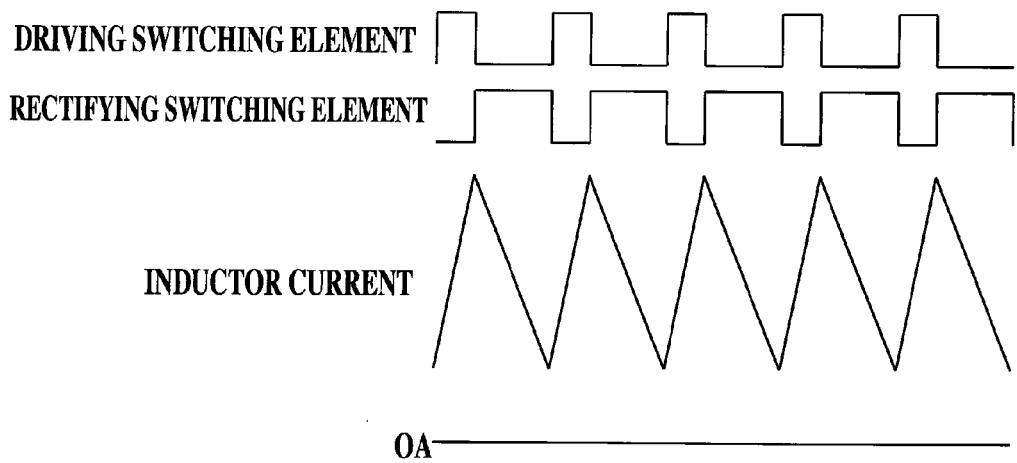
FIG. 11A is a timing chart showing the states of the changes of on-off control signals and a coil current in the case of setting a load to a large one in a conventional switching regulator.

In a state of bearing a large load, the switching regulator performs the operation similar to that of the conventional switching regulator, which has been described with reference to FIGS. 11A, 11B and 11C. Accordingly, the description of the operation at the time of bearing the large load is omitted.

Figure 11B:
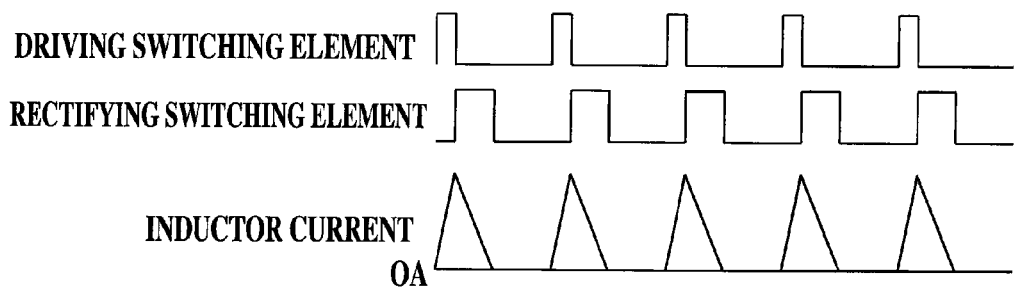
FIG. 11B is a timing chart showing the states of the changes of the on-off control signals and the coil current in the case of setting the load to a middle one in the conventional switching regulator.
Figure 11C:
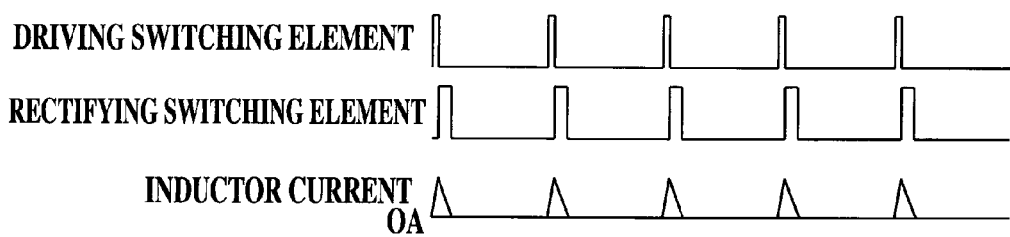
FIG. 11C is a timing chart showing the states of the on-off control signals and the coil current in the case of setting the load to a small one in the conventional switching regulator.

FIG. 3A shows the states of the changes of electric potential, signals, electric currents at several nodes in the case of a load of the degree same as that of the case of FIG. 11B (the case where the output pulse of the PWM comparator 23 is wider than the minimum on-time of the switching elements). At this time, the output Verror of the error amplifier 21 takes a level of crossing the sawtooth wave TW1, input from the waveform generating circuit 22 into the PWM comparator 23.

Consequently, at the timing t1 at which the sawtooth wave TW1 crosses the output Verror from below to above, the control signal S1 of the driving transistor SW1 changes to the low level to turn off the SW1, and the control signal S2 changes to the high level to turn on the rectifying transistor SW2. Consequently, a forward current flowing through the coil is started to be supplied from the SW2 (period T1 in FIG. 3A). Then, the control signal S2 of the rectifying transistor SW2 changes to the low level to turn off the SW2 at the timing t2 at which the output of the reverse current detecting comparator 24 changes from the low level to the high level. Because the driving transistor SW1 is also off at this time, the inductor current of the coil becomes zero (period T2 in FIG. 3A).

After that, the control signal S1 of the driving transistor SW1 changes to the high level to turn on the SW1 at the timing t3 at which the sawtooth wave TW1 crosses the output Verror from above to below, and consequently a forward current flows through the coil from the voltage input terminal IN (period T3 in FIG. 3A).

Figure 3B:
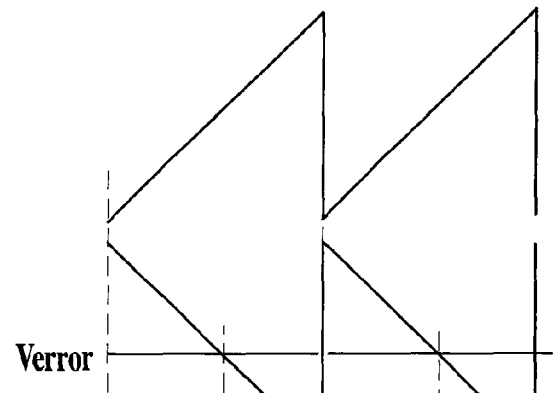
FIG. 3B is a timing chart showing the states of the changes of the signals and electric potential of the several sections when the load of the switching regulator of the first embodiment is extremely small.

FIG. 3B shows the states of the changes of electric potential, signals, electric currents at several nodes in the case of a load of the degree of performing the PFM control or the PDM control by the conventional technique of FIG. 10 (the case where the output pulse of the PWM comparator 23 is narrower than the minimum on-time of the switching elements). At this time, the output Verror of the error amplifier 21 takes a level of being lower than the minimum level of the sawtooth wave TW1, input from the waveform generating circuit 22 into the PWM comparator 23, to cross the sawtooth wave TW2, input into the comparator 25.

Consequently, the output of the PWM comparator 23 adheres to the low level, and the driving transistor SW1 is turned on only during the pulse periods of the minimum on-time pulse Pmin of the switching elements. Thus, a forward current flows only the short periods through the coil from the voltage input terminal IN (period T4 in FIG. 3B). Then, the control signal 52 changes to the high level to turn on the rectifying transistor SW2 at the timing t5, at which the control signal S1 of the driving transistor SW1 changes to the low level. Consequently, a forward current flowing through the coil is started to be supplied from the SW2 (period T5 in FIG. 3B).

After that, even if the output of the reverse current detecting comparator 24 changes from the low level to the high level at the timing t6, at which the coil current becomes zero, the rectifying transistor SW2 is not turned off, and a reverse direction current flows from the coil to the ground point through SW2 (period T6 in FIG. 3B). Then, the output of the comparator 25 changes to the high level to turn off the SW2 at the timing T7, at which the sawtooth wave TW2 crosses the output Verror from above to below. Because also the driving transistor SW1 is off until the timing t8, at which the next minimum on-time pulse Pmin is output, the current of the coil becomes zero (period T7 in FIG. 3B).

Figure 4:
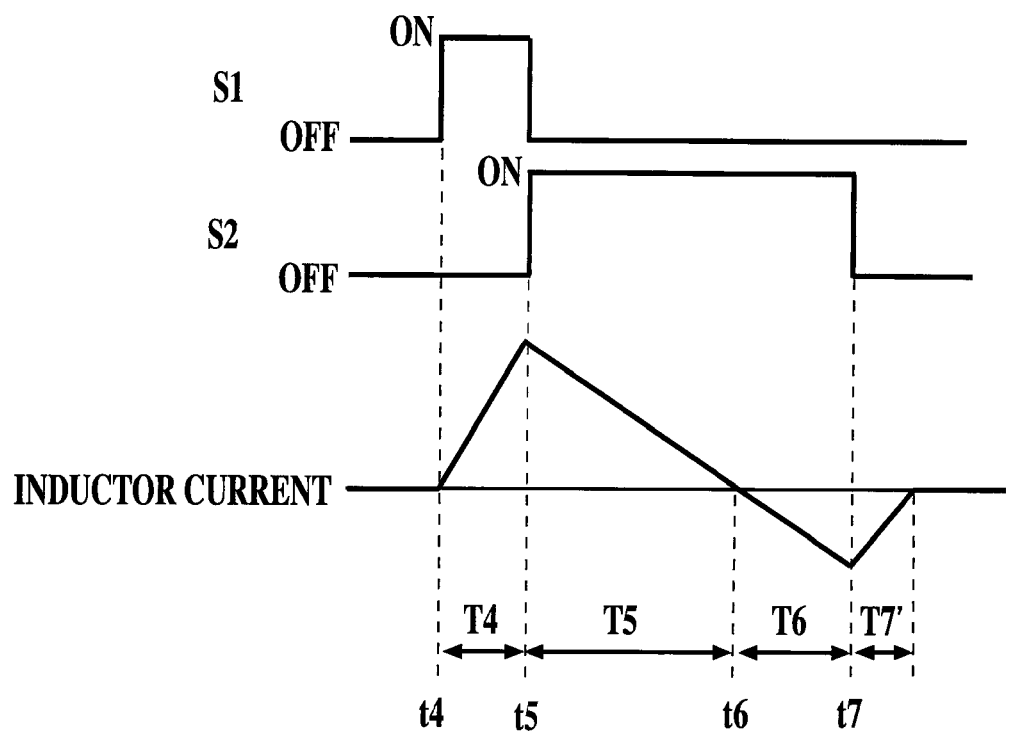
FIG. 4 is a timing chart showing a part of FIG. 3B by enlarging it.

FIG. 4 shows an enlarged state of the changes of the control signals S1 and S2 and the coil current in the period from the period T4 to the period T7 in FIG. 3B. As shown in FIG. 4, because SW1 is on and SW2 is off in the period T4, positive energy is accumulated in the coil from the voltage input terminal. Because SW1 is off and SW2 is on in the period T5, the positive energy accumulated in the coil is discharged to the load side. Furthermore, because SW1 is off and SW2 is on in the period T6, a current flows from the output side to the ground point, and thereby energy is accumulated in the coil from the output side. Thereby, the SW2 is turned off (also SW1 is turned off) at the timing T7, and consequently the energy, accumulated in the coil, from the output side is discharged in the period T7, and a current flows to the voltage input terminal side through a body diode parasitic in the substrate of the driving transistor SW1 to regenerate the discharged energy. Hereby, the power efficiency at the time of a light load can be improved without changing the switching frequency of driving transistor SW1.

Figure 8A:
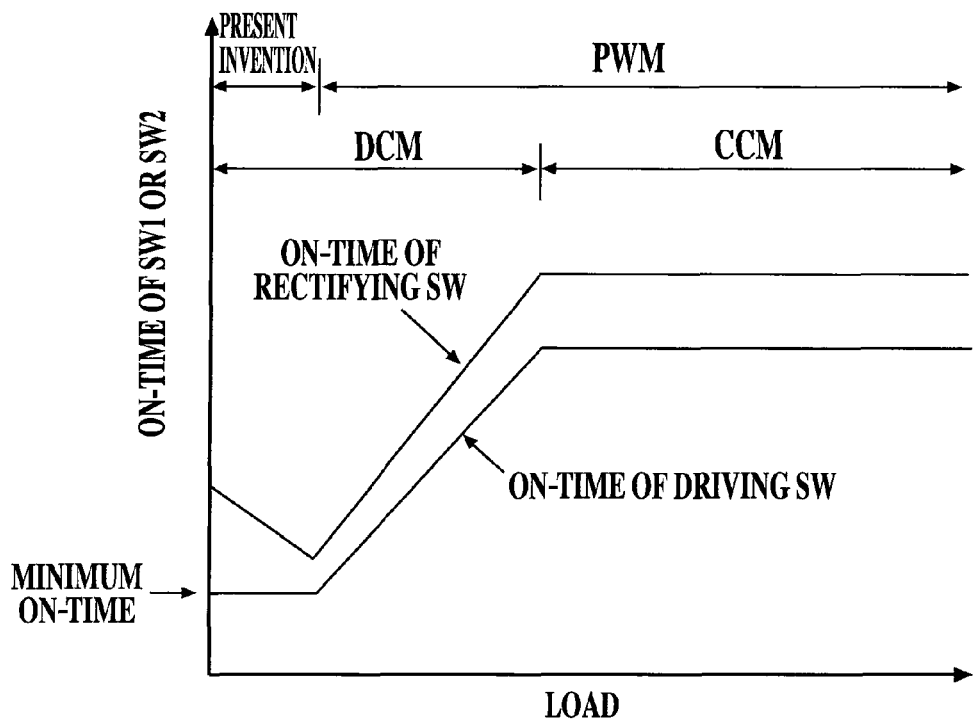
FIG. 8A is a graph showing the relations between the magnitudes of loads and on-times of the switching elements of a regulator to which the present invention is applied.
Figure 8B:
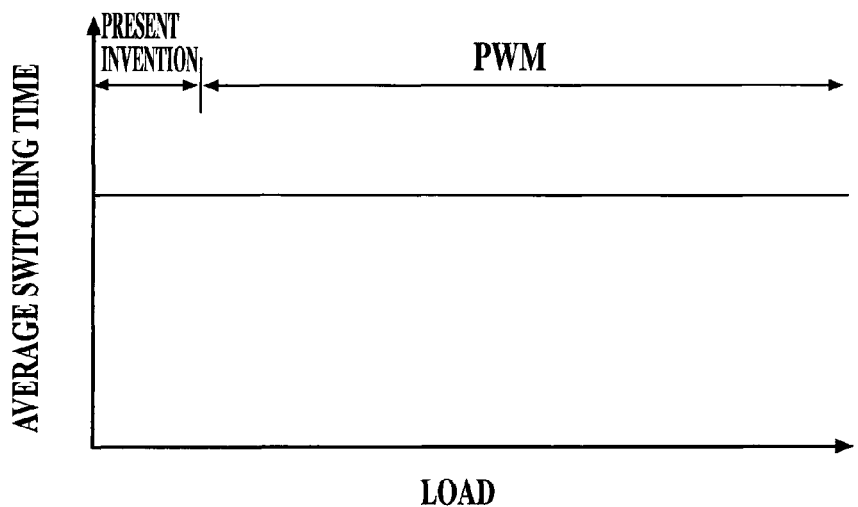
FIG. 8B is a graph showing the relation between the magnitudes of loads and the average switching frequencies of the regulator to which the present invention is applied.
Figure 9A:
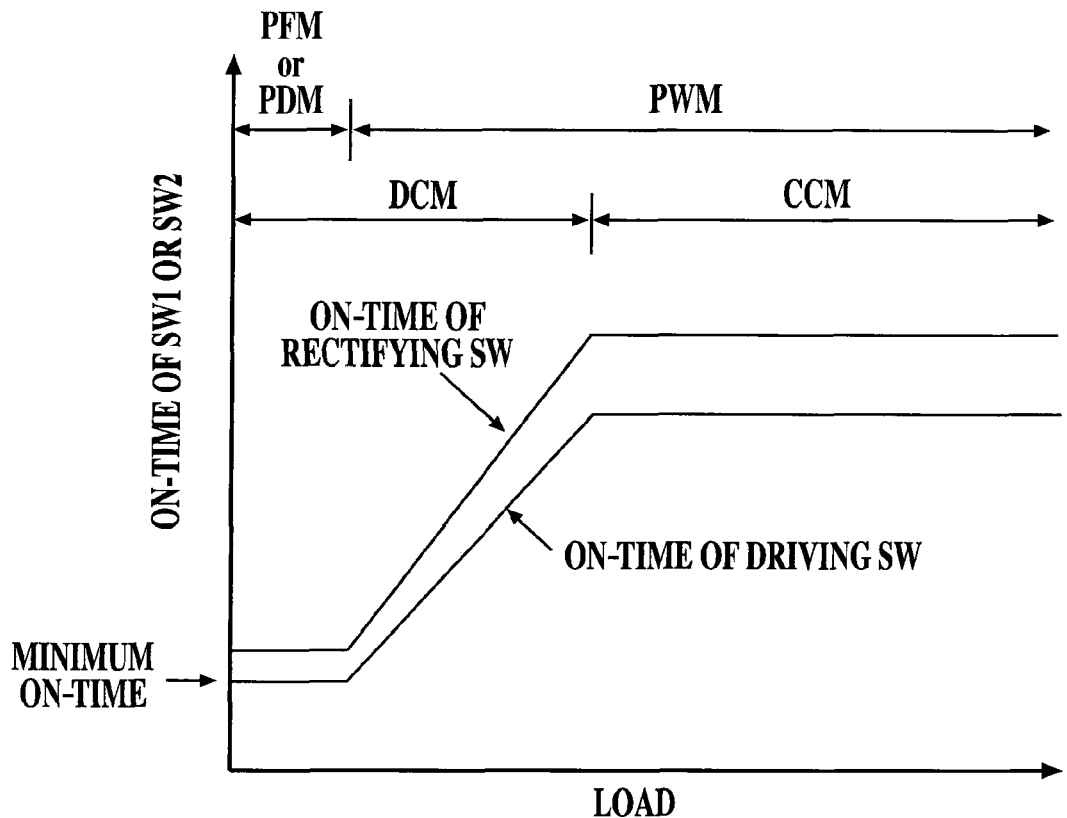
FIG. 9A is a graph showing the relations between the magnitudes of loads and on-times of the switching elements of a conventional regulator.
Figure 9B:
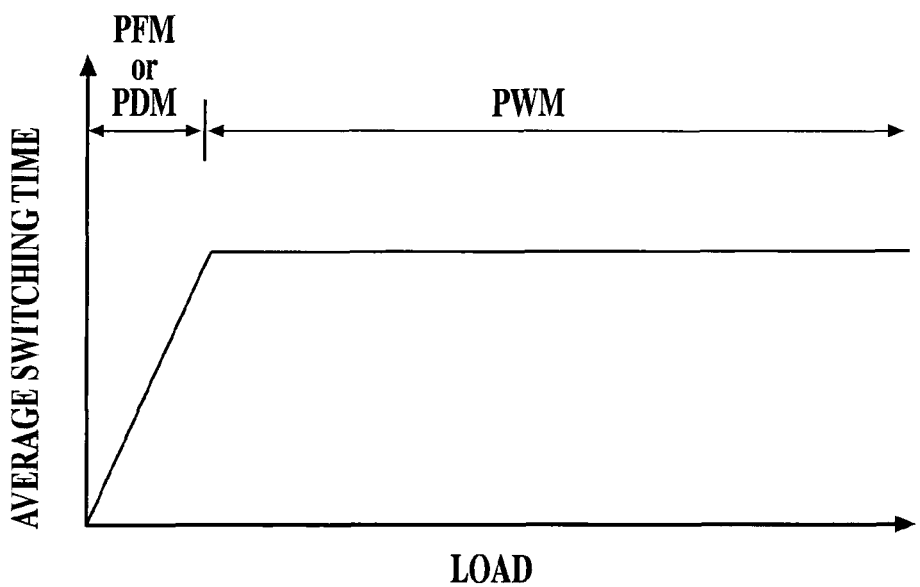
FIG. 9B is a graph showing the relation between the magnitudes of loads and the average switching frequencies of a conventional regulator.
Figure 10A:
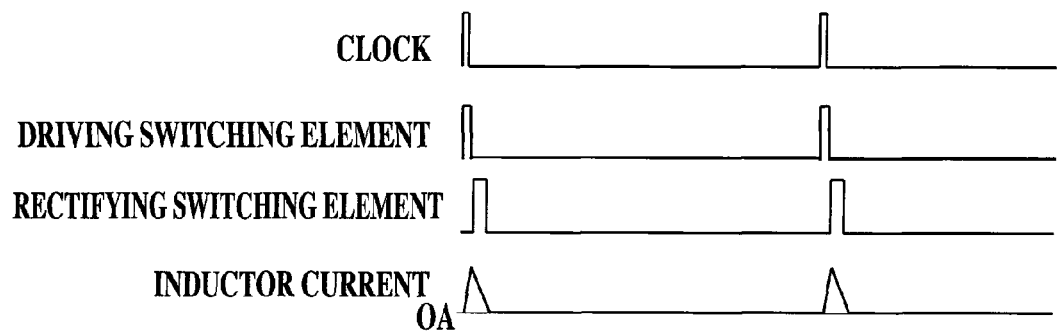
FIG. 10A is a timing chart showing the states of the changes of signals and a coil current in the case of performing PFM control at the time of a light load.
Figure 10B:
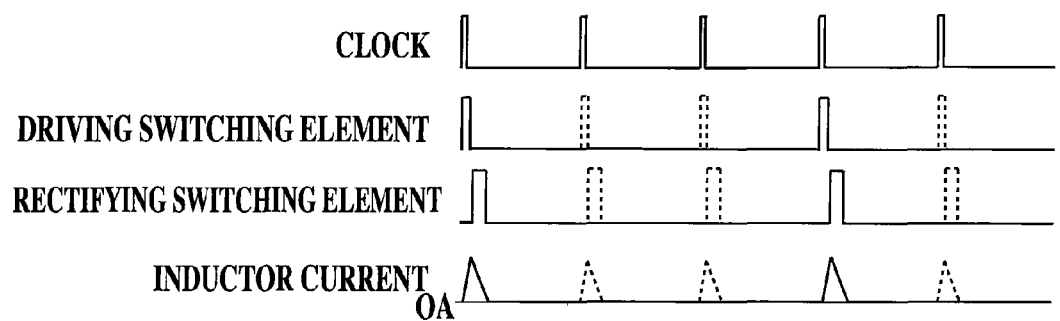
FIG. 10B is a timing chart showing the states of the changes of on-off control signals and a coil current in the case of performing PDM control at the time of a light load.

In the case of performing the PFM (pulse-frequency modulation) control, lowing the clock frequency as shown in FIG. 10A, and the PDM (pulse-duration modulation) control, skipping the clocks as shown in FIG. 10B, the on-times of the switching elements at the time of a light load are left to be constant as shown in FIG. 9A. When the present embodiment is applied, however, as shown in FIG. 8A, the on-time of the rectifying switching element is lengthened as the load becomes lighter. As a result, although the average switching frequency by the PFM control or the PDM control changes as shown in FIG. 9B in the conventional circuit, the average switching frequency does not change as shown in FIG. 8B in the present embodiment, and hereby the advantages that a noise measurer becomes easy, such as the simplification of the design of an EMI filter, and that ripples are furthermore suppressed and the average switching frequency does not lower to the audible area, are produced.

Figure 2:
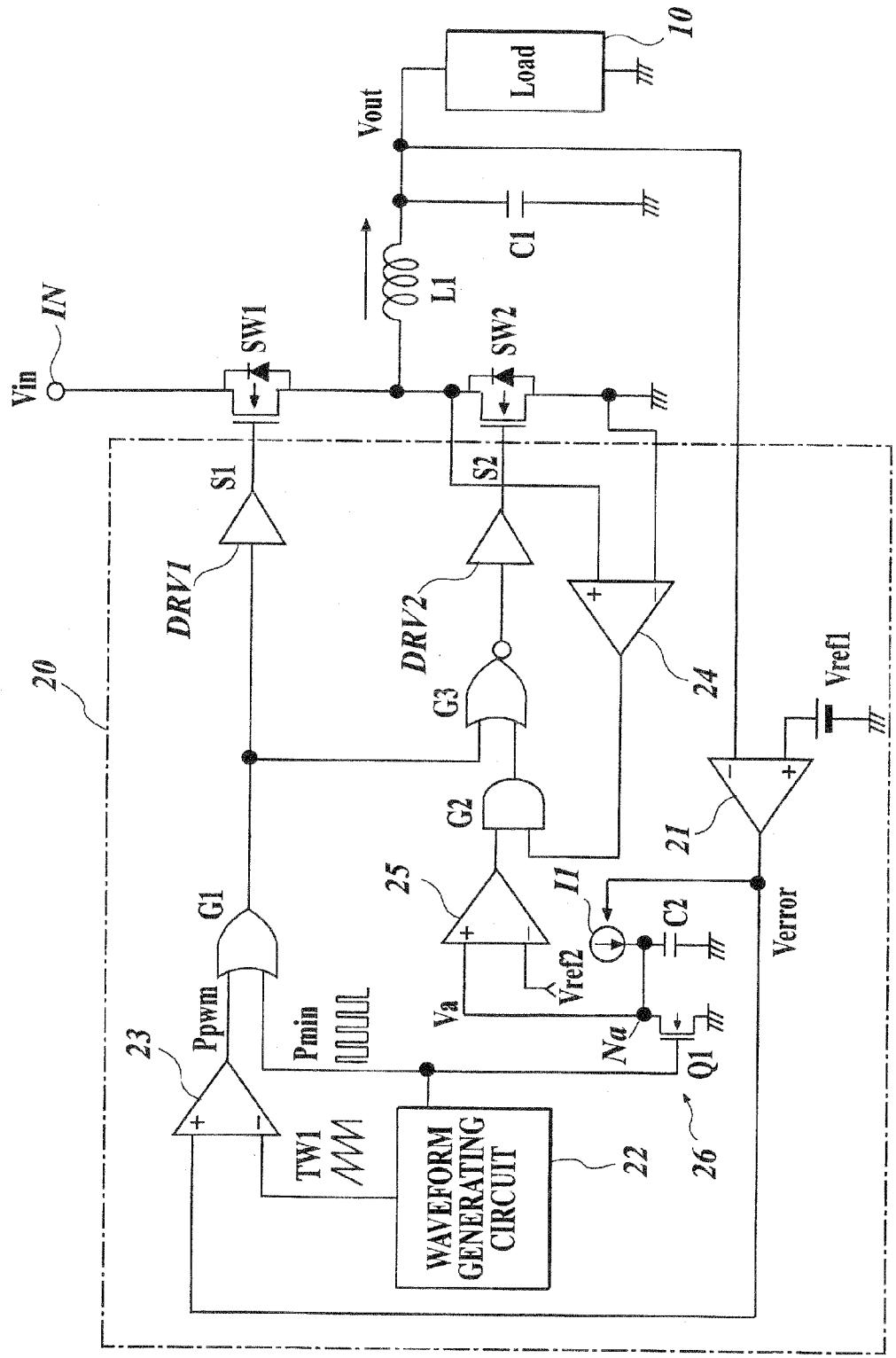
FIG. 2 is a circuit configuration diagram of a second embodiment showing a switching regulator to which the present invention is applied.

FIG. 2 shows a second embodiment of the step-down switching regulator to which the present invention is applied.

The switching regulator of this embodiment is configured to give a reference voltage Vref2 as the input into the inverting input terminal of the comparator 25 in place of the sawtooth wave TW2 in the first embodiment, and to be provided with a timer circuit 26 for determining the on-time of the rectifying transistor SW2 at the time of a light load to input the output of the timer circuit 26 to the son-inverting input terminal of the comparator 25 in the control circuit 20.

The timer circuit 26 is composed of a constant current source I1, the current value of which is controlled by the Output of the error amplifier 21, a capacitor C2, connected to the constant current source I1 in series, and a resetting transistor Q1 for resetting the charged charges in the capacitor C2. This transistor Q1 is configured to perform its on-off operation in conformity with the minimum on-time pulse Pmin, output from the waveform generating circuit 22. The constant current source I1 is controlled to flow a smaller current as the output level of the error amplifier is higher, namely as the load, is smaller.

Figure 5A:
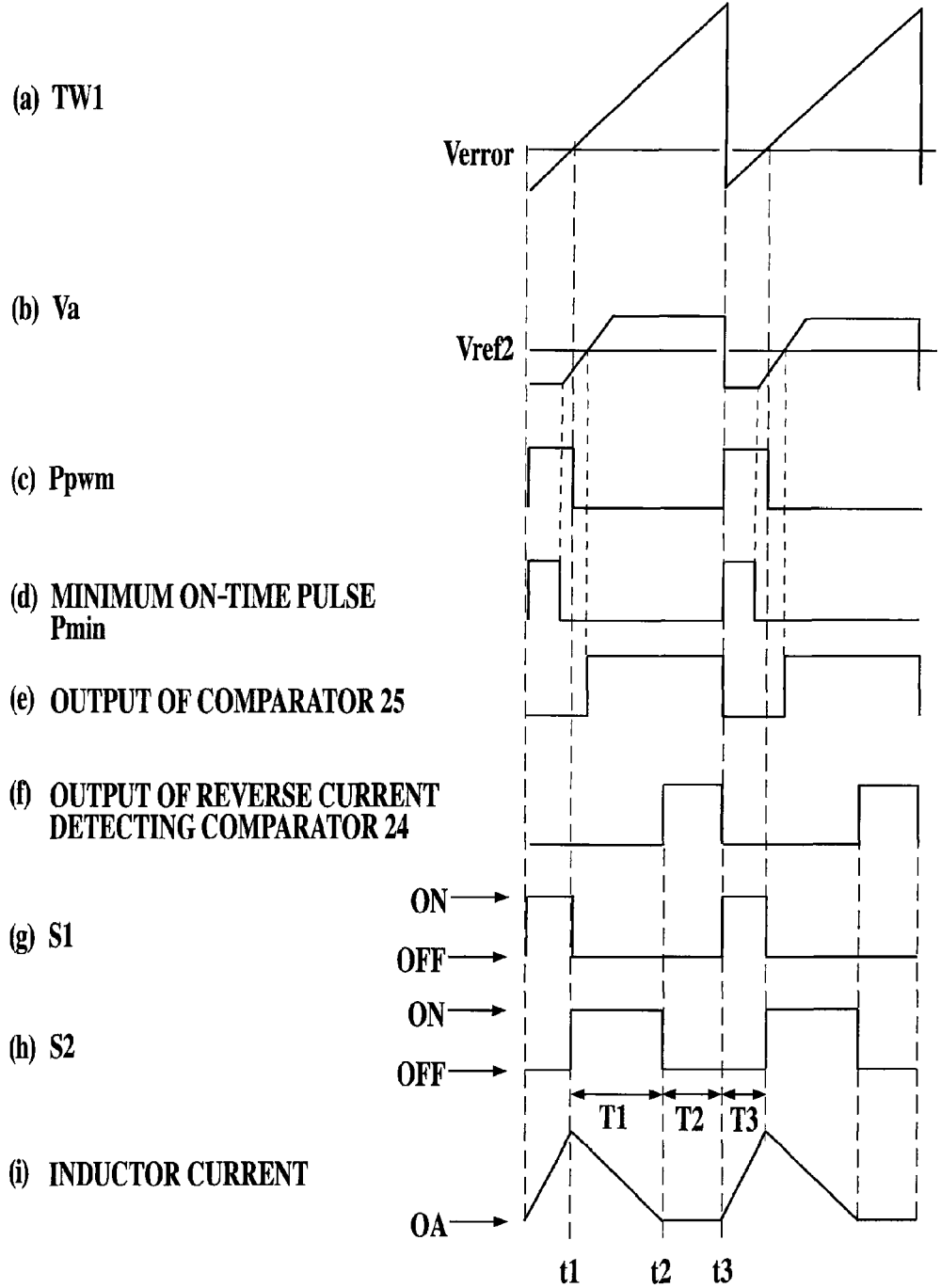
FIG. 5A is a timing chart showing the states of the changes of the signals and electric potential of the several sections when the load of the switching regulator of the second embodiment is rather small.
Figure 5B:
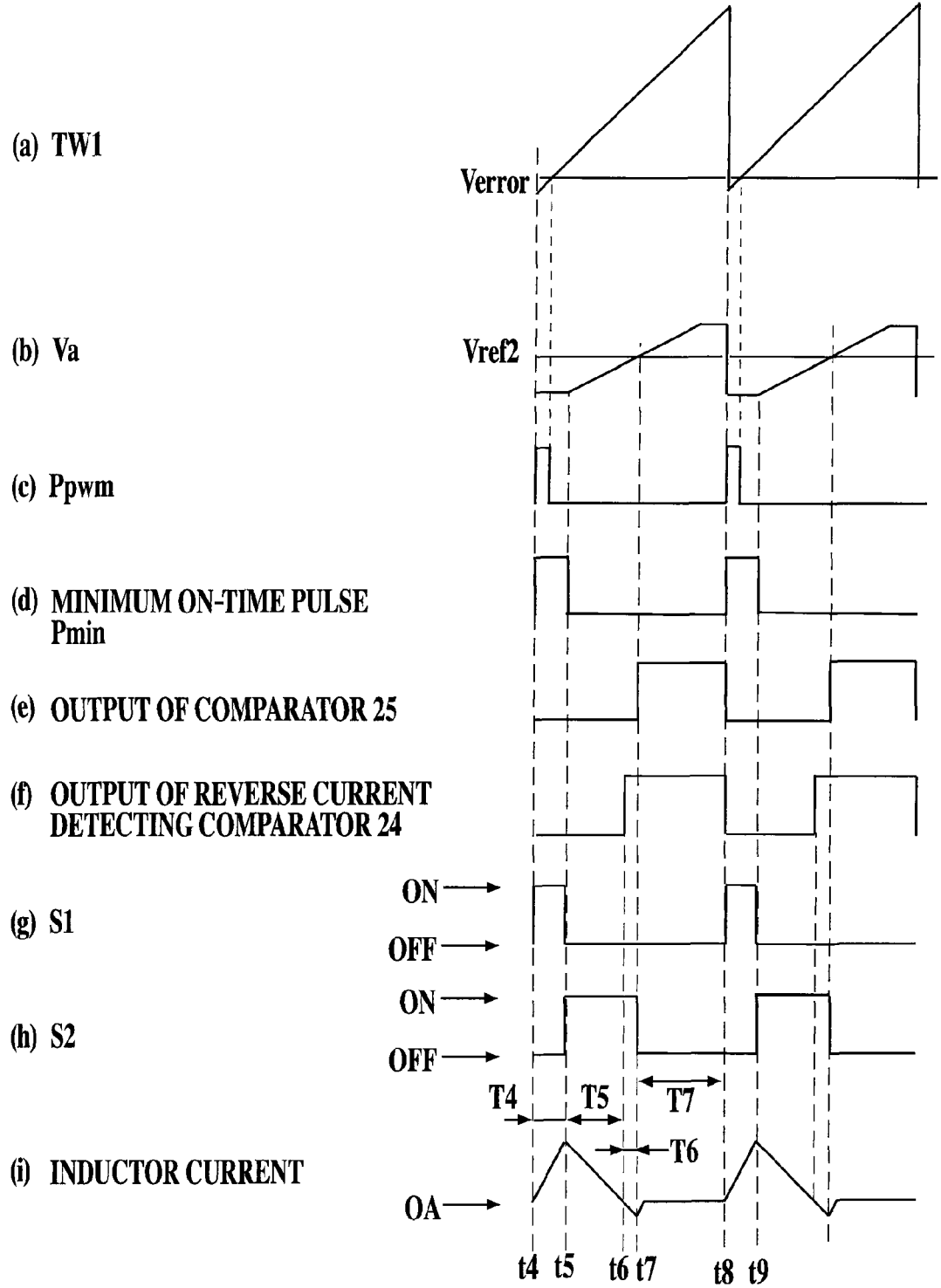
FIG. 5B is a timing chart showing the states of the Changes of the signals and electric potential of the several sections when the load of the switching regulator of the second embodiment is extremely small.

The operation of the switching regulator of FIG. 2 will be described with reference to the timing chart of FIG. 5. FIG. 5A shows the case where the load, is rather small similarly to the case of FIG. 3A, and FIG. 5B shows the case where the load is extremely small similarly to the case of FIG. 3B, FIG. 5B shows the relation between the electric potential Va of an inner node Na of the timer circuit 26 and the reference voltage Vref2 of the comparator 25.

Because the constant current source I1 of the timer circuit 26 of this embodiment is configured to make a smaller current flow as the load is smaller, the inclination of the changes of the electric potential Va of the inner node Na of the timer circuit 26 becomes more gentle as the load is smaller. Hereby, if the load is extremely light, as shown in FIG. 5B, the electric potential Va of the node Na becomes higher than the reference voltage Vref2, and the timing t7, at which the rectifying transistor SW2 is turned off, is shifted backward to secure the period T6, in which a reverse direction current flows through the coil to accumulate negative energy in the coil. In addition, because the charged charges in the capacitor C2 are reset by the turning-on of the resetting transistor Q1 by the minimum on-time pulse Pmin at the timing t8, the electric potential Va of the inner node of the timer circuit rapidly falls to the ground potential at the timing t8, and the charging of the capacitor C2 is again started when the pulse Pmin becomes the low level (timing t9).

In addition, in the above embodiments, the minimum on-time pulse Pmin can be defined as a pulse having the shortest pulse width in the range in which the on-resistance of the transistor SW1, which is turned on by the pulse, does not increase on the relation between the characteristics of the driving transistor SW1 as the switching element, turned on and off by the pulse, and the driving force of the circuit (driver) generating the pulse.

In a switching regulator subjected to the application of the mode (current mode) of detecting the electric current flowing through the driving transistor SW1 to perform control to determine the off-timing of the driving transistor SW1 on the basis of the detected signal and the output of the error amplifier 21, however, the pulse width of the minimum on-time pulse is sometimes determined from the following point of view: an electric current charging the parasitic capacitor immediately after turning on the driving transistor SW1 flows, and thereby pulse-shaped noise is generated on the detected signal of current to avoid the turning-off of the transistor SW1 at an erroneous timing by the noise. Then, the pulse width sometimes becomes longer than the pulse width of the minimum on-time pulse, which is determined by the relation between the characteristics of the switch transistor and the driving force of the driver. The minimum on-time pulses of the present invention include the minimum on-time pulse in the switching regulator of the current mode described above, and the like.

Figure 6:
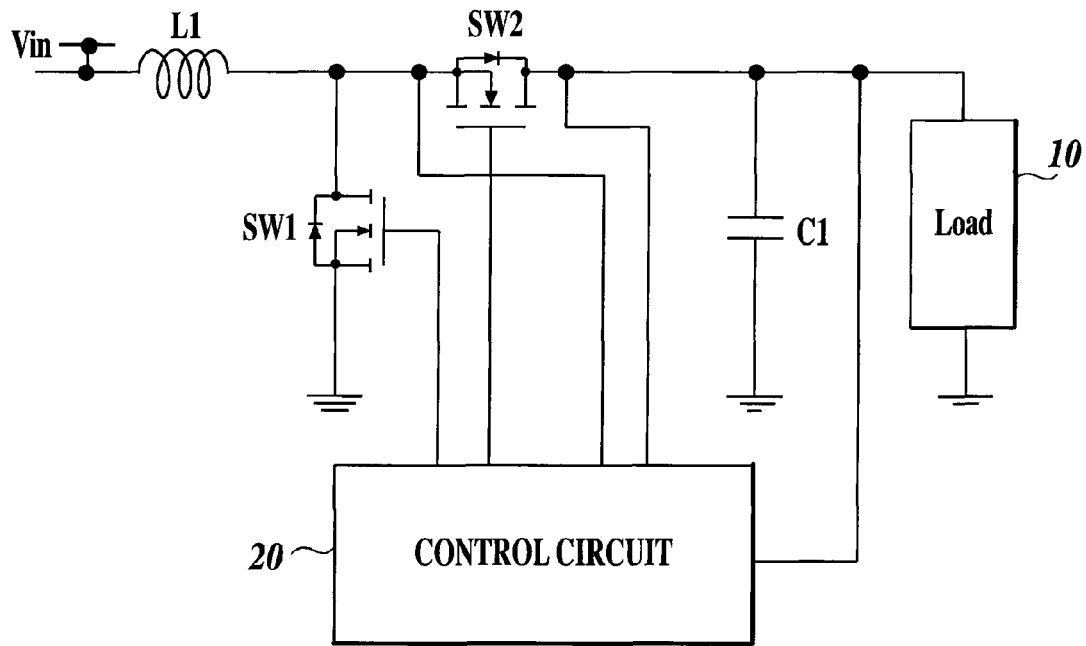
FIG. 6 is a circuit configuration diagram showing an example of a step-up regulator effective for the application of the present invention.
Figure 7:
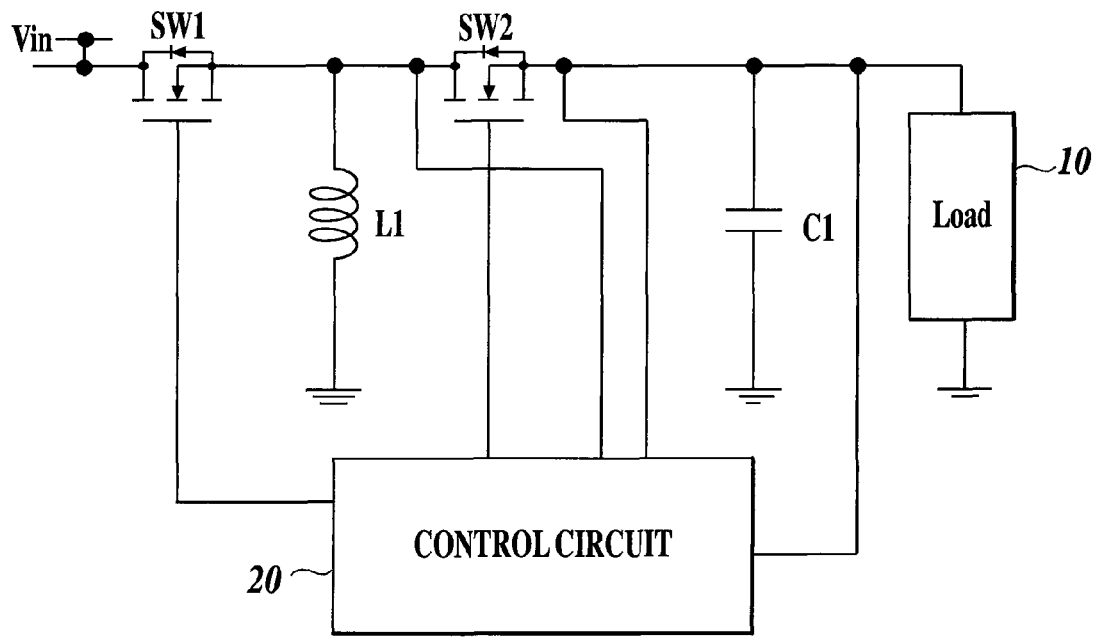
FIG. 7 is a circuit configuration diagram showing an example of a negative voltage regulator effective for the application of the present invention.

FIGS. 6 and 7 show other configuration examples of the switching regulators to which the present invention can effectively be applied. Among them, FIG. 6 shows a step-up regulator (boost converter), and FIG. 7 shows a negative voltage regulator (back boost converter).

The step-up regulator of FIG. 6 operates to accumulate energy in the coil L1 by turning on the driving transistor SW1 in the state in which the rectifying transistor SW2 is off to make a current flow through the coil L1. After that, the step-up regulator discharges the energy in the coil L1 to the output terminal side by turning off the driving transistor SW1 and turning on the rectifying transistor SW2. The step-up regulator thereby generates a boosted output voltage.

On the other hand, the negative voltage regulator of FIG. 7 operates to accumulate energy in the coil L1 by turning on the driving transistor SW1 in the state in which the rectifying transistor SW2 is off to make a current flow through the coil L1. After that, the negative voltage regulator discharges the energy in the coil L1 to the ground point side by turning off the driving transistor SW1 and turning on the rectifying transistor SW2. Thereby, the negative voltage regulator generates a negative output voltage at the output terminal.

Both the converters of FIGS. 6 and 7 can obtain the effects similar to those of the embodiments described above, which effects are that the power efficiency at the time of a light load can be improved without changing the switching frequency of the driving transistor SW1, and that the problems of the complication of the design of an EMI filter, the enlargement of ripples, the generation of abnormal noise when the switching frequency lowers to the audible area, and the like can be settled, by configuring the control circuit 20, performing the on-off control of the transistors SW1 and SW2, to be similar to those of the embodiments in FIGS. 1 and 2.

The invention by the inventor of the present application has concretely been described above on the basis of the embodiments, but the present invention is not limited to the aforesaid embodiments. For example, although the control circuits of the aforesaid embodiments use sawtooth waves as the waveform signals to be supplied to the PWM comparator 23 and the comparator 25, a strict triangular wave, having an inclination at each of a rise and a fall thereof may be used. The "triangular wave" in the claims of the present invention includes not only the narrowly defined triangular wave mentioned above, but also a sawtooth wave.

Furthermore, although the control circuits of the embodiments described above incorporate an oscillating circuit in the waveform generating circuit 22, it is possible to configure the control circuits to generate a signal having a desired waveform by supplying a clock signal from an oscillator on the outside of the chip to the waveform generating circuit 22 in the case of configuring the whole control circuit 20 as a semiconductor integrated circuit. Also it is possible to similarly configure the control circuits to generate the reference voltages Vref1 and Vref2, supplied to the error amplifier 21 and the comparator 25, respectively, in the chip, or to give the reference voltages Vref1 and Vref2 from the outside of the chip.

Furthermore, although the output voltage is directly input into the error amplifier 21 as a feedback voltage in the switching regulators of the embodiments described it is also possible to configure the switching regulators to provide a series resistor between the output terminal and the ground point to input the voltage divided by the series resistor into the error amplifier 21.

Furthermore, although the second embodiment is configured to control the on-time of the rectifying transistor SW2 at the time of a light load by providing the timer circuit 26, including the constant current source controlled by the output of the error amplifier 21, any Circuit may be used as long as the circuit controls the on-time of the rectifying transistor SW2 according to the output of the error amplifier 21 without being limited to the timer circuit 26 as the embodiment.

INDUSTRIAL APPLICABILITY

Although the above description has been given to an example of applying the present invention to a non-insulated switching regulator, the present invention is not limited to that, but the present invention can be applied to a circuit controlling a rectifying switching element in an insulated switching regulator using a transformer.

Although various exemplary embodiments have been shown and described, the invention is not limited to the embodiments shown. Therefore, the scope of the invention is intended to be limited solely by the scope of the claims that follow.

The invention claimed is:

1. A DC-DC converter, comprising:
an inductor for converting voltage;
a driving switching element to control an electric current flowing through the inductor;
a rectifying switching element to be turned on and off complementarily to the driving switching element; and
a switching control circuit to generate control signals of the driving switching element and the rectifying switching element,
wherein the switching control circuit includes:
an error amplifier to output a voltage according to a potential difference between a feedback voltage from an output side and a reference voltage;
a PWM control pulse generating circuit to receive an output of the error amplifier and generate PWM control pulses for controlling the driving switching element and the rectifying switching element by PWM control;
a minimum on-time pulse generating circuit to generate a minimum on-time pulse having a pulse width corresponding to a minimum on-time of the driving switching element; and
an off-timing delaying circuit to delay a switching timing of the rectifying switching element from its on-state to its off-state by the control signal of the rectifying switching element for a longer time as a load becomes lighter according to the output of the error amplifier at a time of a light load at which the PWM control pulses become narrower than a pulse width of the minimum on-time pulse.

2. The DC-DC converter according to claim 1, wherein the switching control circuit includes a reverse current detecting circuit to detect a flow of a current in the inductor in a direction reverse to a direction at an on-time time of the driving switching element, and
wherein the switching control circuit is configured to make the off-timing delaying circuit or an output thereof effective based on detection of a reverse direction current by the reverse current detecting circuit.

3. The DC-DC converter according to claim 1, further comprising a waveform generating circuit to generate a triangular wave of a predetermined frequency,
wherein the PWM control pulse generating circuit includes a PWM comparator to compare a first triangular wave generated by the waveform generating circuit and the output of the error amplifier to generate the PWM control pulse, and
wherein the off-timing delaying circuit includes a second comparator to compare a second triangular wave vertically symmetrical to the first triangular wave, generated by the waveform generating circuit, and the output of the error amplifier to generate a signal having an off-timing.

4. The DC-DC converter according to claim 1, further comprising a waveform generating circuit to generate a triangular wave of a predetermined frequency,
wherein the PWM control pulse generating circuit includes a PWM comparator to compare the triangular wave generated by the waveform generating circuit and the output of the error amplifier to generate the PWM control pulse, and
wherein the off-timing delaying circuit includes a timer circuit and a second comparator, the timer circuit including a current source to make an electric current according to the output of the error amplifier flow and a capacitor element to be charged by the current source, the timer circuit using the minimum on-time pulse generated by the minimum on-time pulse generating circuit as a reset signal, and the second comparator comparing an output potential of the timer circuit and a predetermined reference voltage to generate a signal having an off-timing.

5. The DC-DC converter according to claim 1, wherein:
the driving switching element is connected between a direct-current voltage input terminal, to which the input direct-current voltage is applied, and one terminal of the inductor;
the rectifying switching element is connected between the one terminal of the inductor and a ground point; and
a smoothing capacitor is connected between another terminal of the inductor and the ground point, the smoothing capacitor outputting a voltage which is a stepped-down input direct-current voltage.

* * * * *